United States Patent [19]
Miura et al.

[11] Patent Number: 5,327,543
[45] Date of Patent: Jul. 5, 1994

[54] SYSTEM FOR SELECTIVELY MASKING OPERAND PORTIONS FOR PROCESSING THEREOF

[76] Inventors: Masaharu Miura, 202, Hikariso, 6-2-3, Higashi-cho,, Houya-shi, Tokyo; Shumpei Kawasaki, 301, Koganeinishi-Pahkuhoumuzu, 3-13-15, Nukuiminami-cho, Koganei-shi, Tokyo, both of Japan

[21] Appl. No.: 513,034

[22] Filed: Apr. 23, 1990

Related U.S. Application Data

[63] Continuation of Ser. No. 241,909, Sep. 7, 1988, abandoned.

[30] Foreign Application Priority Data

Sep. 10, 1987 [JP]  Japan ................................. 62-226895

[51] Int. Cl.$^5$ ............................................. G06F 9/302
[52] U.S. Cl. ................................. 395/375; 364/736;
364/258; 364/259.7; 364/259.5; 364/937.1;
364/947.4; 364/947.6; 364/DIG. 2; 395/775;
395/800
[58] Field of Search .............. 395/375, 800, 775;
364/736

[56] References Cited

U.S. PATENT DOCUMENTS 4,139,899  2/1979  Tulpule et al. .................. 364/900
4,241,396  12/1980  Mitchell et al. .................. 364/200

FOREIGN PATENT DOCUMENTS

0207519A2  of 0000  European Pat. Off. .
0250130A2  of 0000  European Pat. Off. .
61-23998    2/1986  Japan .

OTHER PUBLICATIONS

David A. Moon, "Symbolics Architecture", 8153 Computer, vol. 20, No. 1, Jan. 1987, pp. 43–52. (Provided in English).

*Primary Examiner*—Robert B. Harrell
*Assistant Examiner*—Ken S. Kim
*Attorney, Agent, or Firm*—Fay, Sharpe, Beall, Fagan, Minnich & McKee

[57] ABSTRACT

A processor capable of processing data of a structure having a first information field and a second information field includes conservation means for conserving the information of the predetermined second information field of the input data. Thus, in executing a logical operation or a shift operation, the step of separating the first data fields and second data fields from the data to-be-processed and the step of affixing the predetermined second field to the result of the operation are dispensed with, thereby to achieve a high-speed operation for the data of the structure having the first information field and the second information field.

6 Claims, 8 Drawing Sheets

SYSTEM FOR SELECTIVELY MASKING OPERAND PORTIONS FOR PROCESSING THEREOF

This is a continuation of copending application Ser. No. 0/241,909 filed on Sep. 7, 1988 abandoned.

BACKGROUND OF THE INVENTION

The present invention relates to a data processor which includes operation means, such as an arithmetic and logic operation unit or a shift operation unit, capable of processing data of a structure having a first information field and a second information field. By way of example, it relates to a technique which is effective when applied to the operations of abstract data each having a data field, and a tag field for expressing the type or attribute of data contained in the data field.

Abstract data in which the attribute or data type of data such as the integer type or the floating point type is expressed by a tag field is, for example, one of a data structure having a data field and the tag field within one word. An arithmetical or logical operation or a shift operation for such abstract data needs to be executed, in effect, for the information of the data fields, and the operated result is set as the information of the data field pairing with the tag field expressing the attribute thereof.

Heretofore, an arithmetic and logic operation unit or a barrel shifter has been constructed so as to execute an arithmetical or logical operation or a shift operation for the respective bits of data received as inputs. Accordingly, in a case where only partial fields contained in data to-be-processed are subjected to a substantial operation because of the property of the data structure thereof, as in the abstract data, there must be adopted a procedure wherein data fields and tag fields are separated from the data to-be-processed, the information items of the separated data fields are subjected to a predetermined operation, and a predetermined tag field is affixed to the operated result. Incidentally, an example of a literature in which a data processor is described is "LSI Handbook," p. 536, published by the Ohm-Sha, Ltd. on Nov. 30, 1984.

SUMMARY OF THE INVENTION

However, in the case of executing the operation of the abstract data in accordance with the above procedure, there has been the problem that the speed of the operation is reduced drastically due to the necessity of separating the data fields and the tag fields from the data to-be-processed, the step of subjecting the information items of the separated data fields to the predetermined operation, and the step of affixing the predetermined tag field to the result. Such a problem forms an obstacle to raising the speed of a process which is based on an AI (artificial intelligence) language and which proceeds while deciding the types of data encountered during the run of a program.

An object of the present invention is to provide a data processor which can execute operations at high speed for data of a structure having a first information field and a second information field.

The above and other objects and novel features of the present invention will become apparent from the description of this specification and the accompanying drawings.

Typical aspects of performance of the present invention are briefly summarized as follows:

An arithmetic and logic operation unit which can accept data items on two input sides and then process them, each of the data items being of a structure having a first information field and a second information field, is provided on one of the input sides with mask circuitry or means capable of masking the second information field contained in the input data, into a predetermined logical value in accordance with the sort of an arithmetical or logical operation. By way of example, in a case where a logical sum, exclusive "or" or addition operation or the like is executed by the arithmetic and logic operation unit, the second information field of the input data on one side is masked into a logic "0" by the mask circuit means, and in a case where a logical product or subtraction operation or the like is executed, the second information field of the input data on one side is masked into a logic "1" by the mask circuit. In this way, the arithmetical or logical operation for one pair of input data is executed, and the operated result contains the result of the arithmetical or logical operation between the first information fields. The operation also conserves information of the second information field of the input data.

In addition, a shift operation unit, such as barrel shifter, can accept data items on two input sides and subject them to a shift operation. Each of the data items has a structure having a first information field and a second information field. The shift operation unit is constructed of rearrange circuitry or means capable of rearranging the information fields so that information items of the first information fields, respectively contained in one pair of input data to-be-processed, may be put into a serial form. A shift operation circuit or means for executing the shift operation for data delivered as an output from the rearrange circuit, and replace means is provided which is capable of replacing a part of data delivered as an circuit or output from the shift operation means with information of the second information field contained in the input data on one side. According to this shift operation unit, the information items of the first information fields, respectively contained in one pair of input data to-be-processed, are rearranged so as to become interlacingly serial. They are then subjected to the shift operation, and the operated result is partly replaced with the information of the predetermined second information field, which is conserved.

A data processor, including the arithmetic and logic operation unit or the shift operation unit as described above, makes it unnecessary, in executing the logical operation or the shift operation, to perform the step of separating the first data fields and second data fields from the data to-be-processed. Also rendered unnecessary is the step of affixing the predetermined second field to the result of the operation to achieve a high-speed operation for the data of the structure having the first information field and the second information field.

DESCRIPTION OF THE PREFERRED EMBODIMENTS

Figure 11:
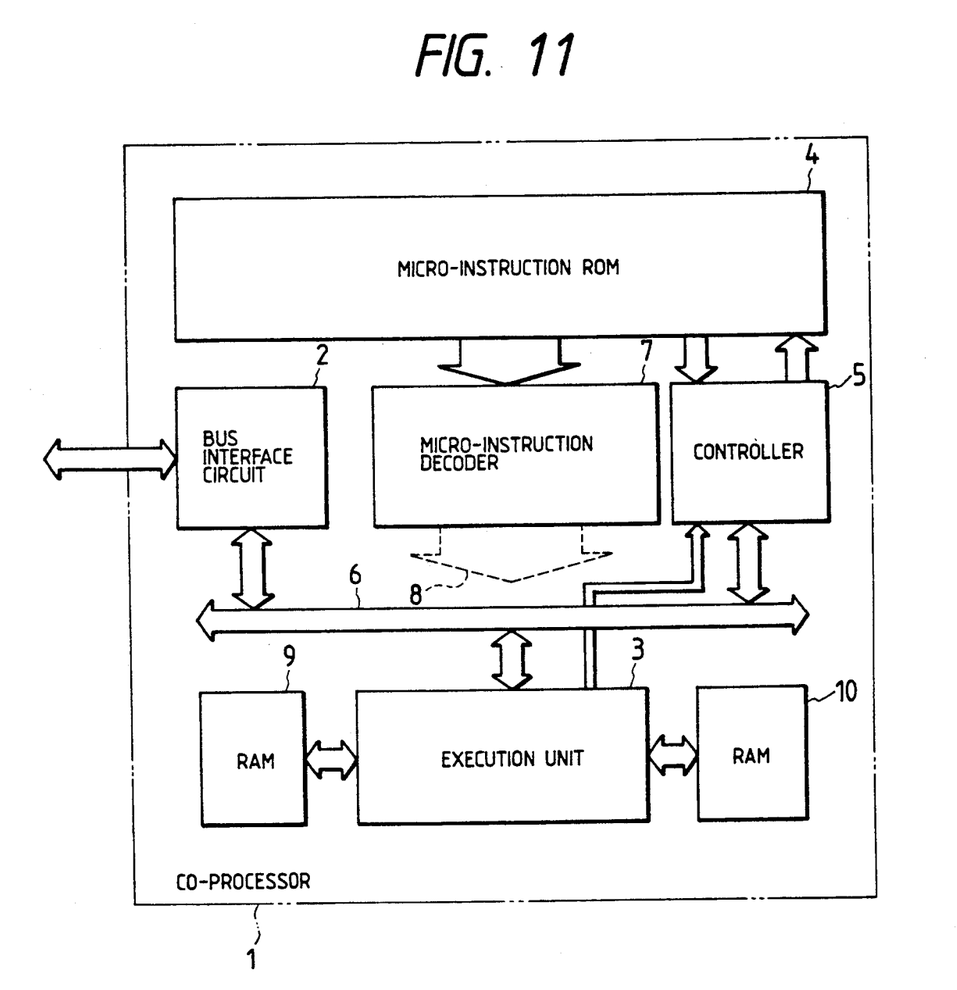
FIG. 11 is a block diagram of an embodiment of a processor which includes the execution unit shown in FIG. 10.

Shown in FIG. 11 is a coprocessor which is an embodiment of a data processor according to the present invention. Although not especially restricted, the coprocessor 1 illustrated in the figure is formed on a single semiconductor substrate, such as silicon, by known techniques for manufacturing semiconductor integrated circuits.

The coprocessor 1 serves to assist the processing ability of an external main processor, not shown, coupled thereto through a bus interface circuit 2 or to lighten the burden of processes on the main processor. It executes processes in accordance with the instructions of the main processor. In particular, this coprocessor 1 includes an execution unit 3 for processing, under microprogram controls, both abstract data (hereinbelow, also simply termed "data with tags") of a structure having a data field as a first information fields, a tag field as a second information field for expressing the attribute or type of data contained in the data field, and data (hereinbelow, also simply termed "data with no tag") of a structure made up of only a data field. Here, although not especially restricted, the tag field is used as a field expressing the attribute or type of data, such as the integer type or the floating point type.

The coprocessor 1 of this embodiment comprises a microinstruction ROM (read-only memory) 4 which stores therein microprograms descriptive of various processing steps for the execution unit 3, etc. The microinstruction ROM 4 is accessed by a controller 5, whereby microinstructions constituting the microprogram are successively read out.

The controller 5 fetches a command given by the unshown main processor through the bus interface circuit 2 as well as an internal bus 6, and it accesses the microinstruction ROM 4 on the basis of address signals obtained by decoding a command code contained in the command or on the basis of address information directly contained in the command. Thus, the first one of a series of microinstructions for executing a process designated by the command is read out. Each of the second one et seq. of the series of microinstructions for executing the process instructed by the command is designated in such a way that the information of a next-address field in the micro-instruction read out immediately before is supplied to the controller 5. The microinstruction read out of the microinstruction ROM 4 in this way is supplied to a microinstruction decoder 7. This microinstruction decoder 7 decodes the given microinstruction, and generates control signals 8 for the execution unit 3, etc. By the way, when a branch of microinstruction flow is necessary during execution of the process, or the like, according to the microinstructions by the execution unit 3, this execution unit 3 gives the controller 5 an instruction therefor.

The execution unit 3 is coupled to the internal bus 6, and is also coupled to a pair of RAMs (random access memories) 9 and 10. The RAMs 9 and 10 store externally-supplied data necessary for operations beforehand, and they are utilized as temporary registers in cases of processes. Accesses to the RAMs 9 and 10 are controlled on the basis of the control signals 8 which are output from the microinstruction decoder 7. By way of example, when the predetermined areas of the RAMs 9 and 10 are utilized as the temporary registers in the case of a floating-point operation, the RAMs 9 and 10 are subjected to such a read-modify-write operation that source data is read out, and that operated result data for the read source data is brought back into the RAMs 9 and 10 as destination data.

Figure 10:
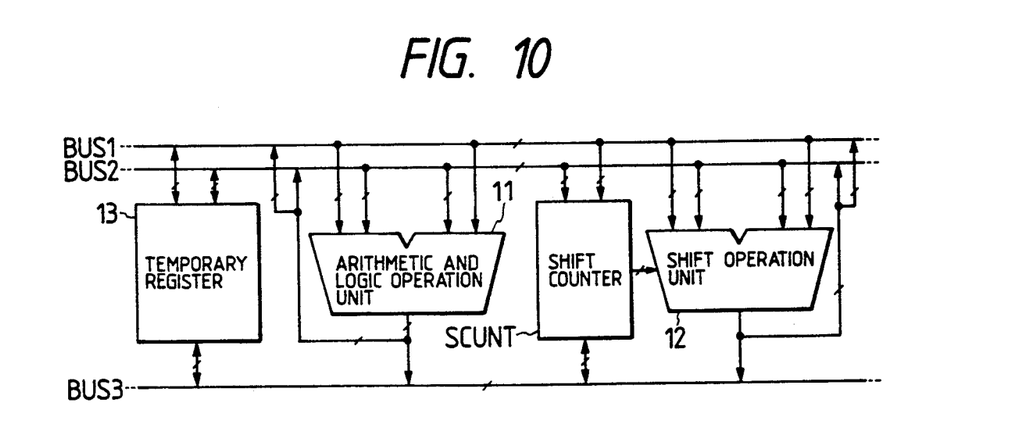
FIG. 10 is a block diagram of an embodiment of an execution unit which comprises the arithmetic and logic operation unit shown in FIG. 1 and the shift operation unit shown in FIG. 5.

FIG. 10 shows an example of the execution unit 3.

Although not especially restricted, this execution unit 3 includes internal buses BUS1, BUS2 and BUS3, each of which is composed of 16 bits. Coupled to the internal buses BUS1, BUS2 and BUS3 are an arithmetic and logic operation unit 11, a shift operation unit 12, a shift counter SCUNT and a temporary register 13 which are typically illustrated. Incidentally, the temporary register 13 can be assigned to the predetermined areas of the RAMs 9 and 10.

Figure 1:
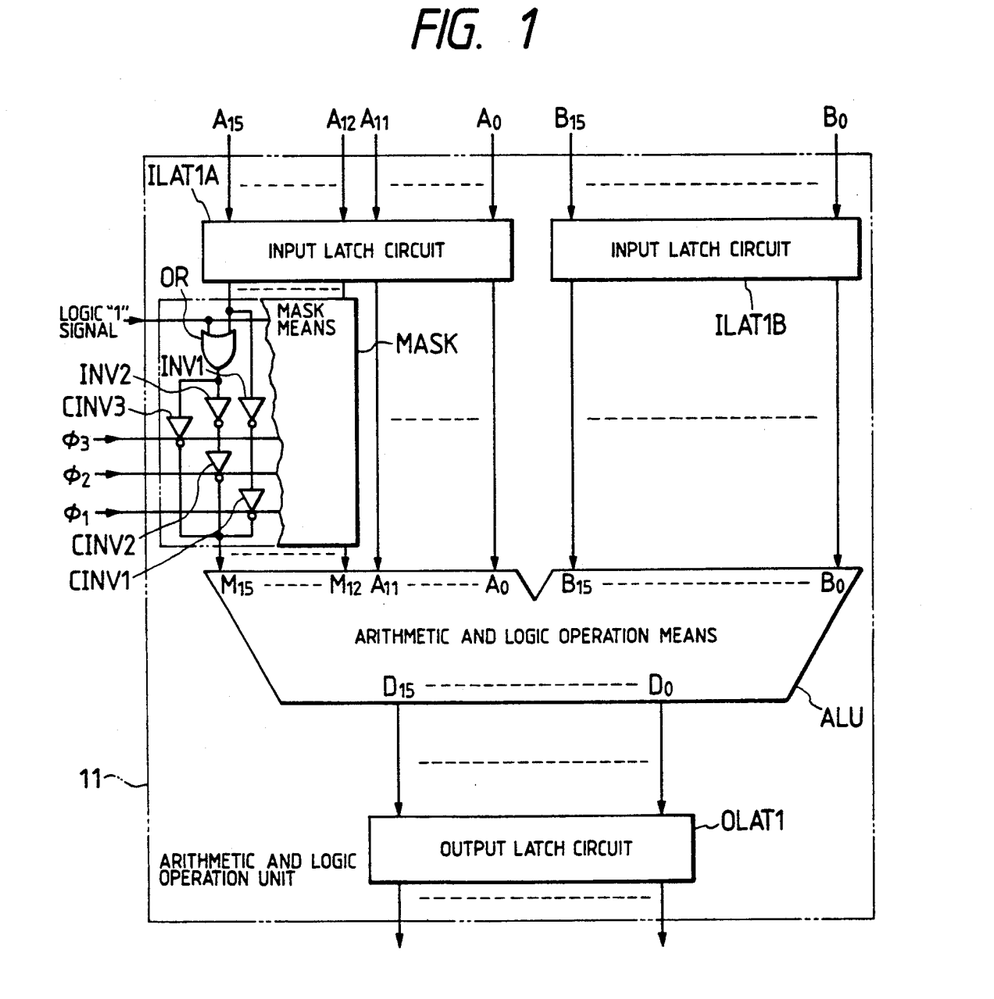
FIG. 1 is a block diagram of an embodiment of an arithmetic and logic operation unit according to the present invention.

FIG. 1 exemplifies the arithmetic and logic operation unit 11.

This arithmetic and logic operation unit 11 has input latch circuits ILAT1A and ILAT1B which are respectively supplied with 16-bit data $A_0$–$A_{15}$ on one side and 16-bit data $B_0$–$B_{15}$ on the other side to-be-processed. The data items $A_0$–$A_{15}$ and $B_0$–$B_{15}$ to be processed are supplied from the internal buses BUS1 and BUS2 separately from each other. In this regard, in a case where the data $A_0$–$A_{15}$ is supplied from the internal bus BUS1 to the input latch circuit ILAT1A, the data $B_0$–$B_{15}$ to be given to the input latch circuit ILAT1B is supplied from the other internal bus BUS2. On the other hand, in a case where the data $A_0$–$A_{15}$ is supplied from the internal bus BUS2 to the input latch circuit ILAT1A, the data $B_0$–$B_{15}$ to be given to the input latch circuit ILAT1B is supplied from the internal bus BUS1. Which of the internal buses the required data is to be accepted from, is controlled by a selection gate, not shown, which is controlled on the basis of the designation of the microinstruction.

Although no special restriction is meant, when one pair of abstract data are to be processed in the arithmetic and logic operation unit 11 of this embodiment, the information of the tag field to be conserved in a processed result, is set to be the information of the tag field which is latched in one input latch circuit ILAT1B. In other words, data which contains the information of the tag field to be conserved in the processed result is supplied to the input latch circuit ILAT1B. In this embodiment, the tag field which expresses the attribute or data type of data such as the integer type or the floating point type is composed of upper 4 bits within 1 word (16 bits) though not especially restricted.

In FIG. 1, symbol MASK denotes mask circuitry or means capable of masking the upper 5 bits $A_{15}$–$A_{12}$, delivered as outputs from the input latch circuit ILAT1A, into a predetermined logical value in accordance with the sort of a logical operation and the sort of the input data. More specifically, as regards the data made up of only the data field, the input bits are directly output without being masked. As regards the data containing the tag field, the upper 4 bits constituting the tag field are masked into a logic "0" for a logical sum, exclusive "or" for an addition operation, and they are masked into logic "1" for a logical product or subtraction operation.

The mask means circuitry MASK has the same circuit arrangements as one another for the respective bits $A_{15}$–$A_{12}$. For example, regarding the bit $A_{15}$, the circuit arrangement includes a path along which the bit $A_{15}$ is output with its logical value left intact by an inverter INV1 and a clocked inverter CINV1 that are connected in series, a path along which the bit $A_{15}$ is altered into logic "1" and then output by an inverter INV2 and a clocked inverter CINV2 that are connected in series to the output terminal of a 2-input "or" gate OR normally supplied with a signal of logic "1" and the bit $A_{15}$, and a path along which the bit $A_{15}$ is altered into logic "0" and then output by a clocked inverter CINV3 that is connected in series to the output terminal of the "or" gate OR.

The selection terminals of the clocked inverters CINV1-CINV3 are respectively supplied with control signal $\phi_1$, $\phi_2$ and $\phi_3$, whereby any of the paths is selected for the input bits $A_{15}$–$A_{12}$.

Although not especially restricted, the control signals $\phi_1$, $\phi_2$ and $\phi_3$ are output from the microinstruction decoder 7 which decodes the microinstructions read out of microinstruction ROM 4 in succession. The series of microinstructions for each of various arithmetical and logical operations as stored in the microinstruction ROM 4 contain information for specifying the sort of the corresponding operation, and information for designating whether or not data to-be-processed is abstract data. Which of the control signals $\phi_1$, $\phi_2$ and $\phi_3$ is to be brought to an operating select level is determined in accordance with the above information items.

In FIG. 1, symbol ALU denotes an arithmetic and logic operation circuit or means capable of executing the respective operations of logical sum, exclusive "or", addition, logical product and subtraction though not especially restricted. The input terminals of the arithmetic and logic operation circuit means ALU on one side are supplied with 4 bits $M_{15}$–$M_{12}$ delivered as outputs from the mask means MASK and the lower 12 bits $A_{11}$–$A_0$ delivered as outputs from the input latch circuit ILAT1A, while the input terminals thereof on the other side are supplied with the 16 bits $B_{15}$–$B_0$ delivered as outputs from the input latch circuit ILAT1B. The operations of logical sum, exclusive "or" etc in the arithmetic and logic operation circuit ALU are controlled by the output control signals 8 of the microinstruction decoder 7. Operated result data items $D_{15}$–$D_0$ are selectively given to the internal buses BUS1, BUS2 and BUS3 through an output latch circuit OLAT1.

Here, the tag field to be conserved in the arithmetic and logic operation unit 11 of this embodiment is set at the bits $B_{15}$–$B_{12}$ as stated above, and the bits $A_{15}$–$A_{12}$ are masked into the logical value "1" or "0" in order to conserve the tag field in the case of the arithmetical or logical operation. On this occasion, in the case of the arithmetical or logical operation for the abstract data, no carry from the lower bits is transmitted to the operated result bits $D_{15}$–$D_{12}$ which are the contents of the tag field to be conserved, and the bits $B_{15}$–$B_{12}$ are conserved as the upper 4 bits $D_{15}$–$D_{12}$ of the operated result without any change. By way of example, a gate capable of selectively blocking a path for transmitting a carry, which might occur on the basis of the operation between the input bits $A_{11}$ and $B_{11}$, to the upper bits is provided though not shown. Such a gate can be constructed of an "and" gate, one input terminal of which is supplied with the control signal of logic "0" from the microinstruction decoder 7 in the case of the arithmetical or logical operation of the abstract data.

Next, the operation of the arithmetic and logic operation unit 11 will be described.

First, the operation in the case of subjecting the input data $A_0$–$A_{15}$ and $B_0$–$B_{15}$ as the abstract data to the logical product (AND) or subtraction (SUB) process will be described with reference to FIG. 2.

The input data items $A_0$–$A_{15}$ and $B_0$–$B_{15}$ have their upper 4 bits $A_{15}$–$A_{12}$ and $B_{15}$–$B_{12}$ set as tag fields TFa and TFb, respectively, and have their lower 12 bits $A_0$–$A_{11}$ and $B_0$–$B_{11}$ set as data fields DFa and DFb, respectively.

When it is instructed to execute the logical product or subtraction process for the data with the tags, microinstructions responsively read out of the microinstruction ROM 4 in succession are decoded by the microinstruction decoder 7, and the mask circuit MASK and the arithmetic and logic operation means ALU are controlled. More specifically, the control signal $\phi_2$ is brought to the selected level, the respective bits $A_{15}$–$A_{12}$ of the tag field TFa in the input data $A_0$–$A_{15}$ are masked into logic "1", and data containing the bits masked into such a logical value and the input data $B_0$–$B_{15}$ on the other side are subjected to the logical product operation or subtraction operation by the arithmetic and logic operation means ALU. In this way, the information items $D_{15}$–$D_{12}$ of a tag field TFe in the operated result data $D_0$–$D_{15}$ are brought to the logical product or subtraction results between "1, 1, 1, 1" and "$B_{15}$, $B_{14}$, $B_{13}$, $B_{12}$", and the information items $B_{15}$–$B_{12}$ of the tag field TFb in the input data $B_0$–$B_{15}$ are conserved. The information items $D_{11}$–$D_0$ of a data field DFe in the operated result data $D_0$–$D_{15}$ are brought to the logical product or subtraction results between $A_{11}$–$A_0$ and $B_{11}$–$B_0$.

Next, the operation in the case of subjecting the input data $A_0$–$A_{15}$ and $B_0$–$B_{15}$ as the abstract data to the logical sum (OR), exclusive "or" (EOR) or addition (ADD) process will be described with reference to FIG. 3.

In this case, microinstructions successively read out of the microinstruction ROM 4 in conformity with the sort of such an operation are decoded by the microinstruction decoder 7, whereby the control signal $\phi_3$ is brought to the select level, the respective bits $A_{15}$–$A_{12}$ of the tag field TFa in the input data $A_0$–$A_{15}$ are masked into logic "0", and data containing the bits masked into such a logical value and the input data $B_0$–$B_{15}$ on the other side are subjected to the logical sum operation, exclusive "or" operation or addition operation by the arithmetic and logic operation means ALU. In this way, the information items $D_{15}$–$D_{12}$ of the tag field TFe in the operated result data $D_0$–$D_{15}$ are brought to the logical sum, exclusive "or" or addition results between "0, 0, 0, 0" and "$B_{15}$, $B_{14}$, $B_{13}$, $B_{12}$" and the information items $B_{15}$–$B_{12}$ of the tag field TFb in the input data $B_0$–$B_{15}$ are conserved. The information items $D_{11}$–$D_0$ of the data field DFe in the operated result data $D_0$–$D_{15}$ are brought to the logical sum, exclusive "or" or addition results between $A_{11}$–$A_0$ and $B_{11}$–$B_0$.

Figure 2:
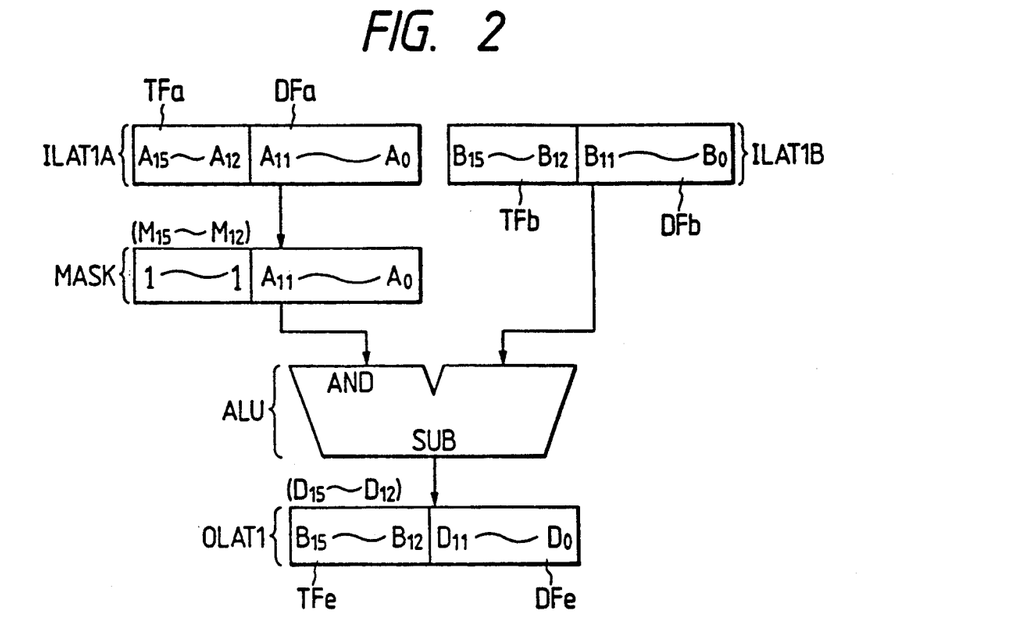
FIG. 2 is a diagram for explaining the operation of the embodiment in FIG. 1 in the case of masking a tag field into logic "1" in the arithmetical or logical operation for data with tags.
Figure 3:
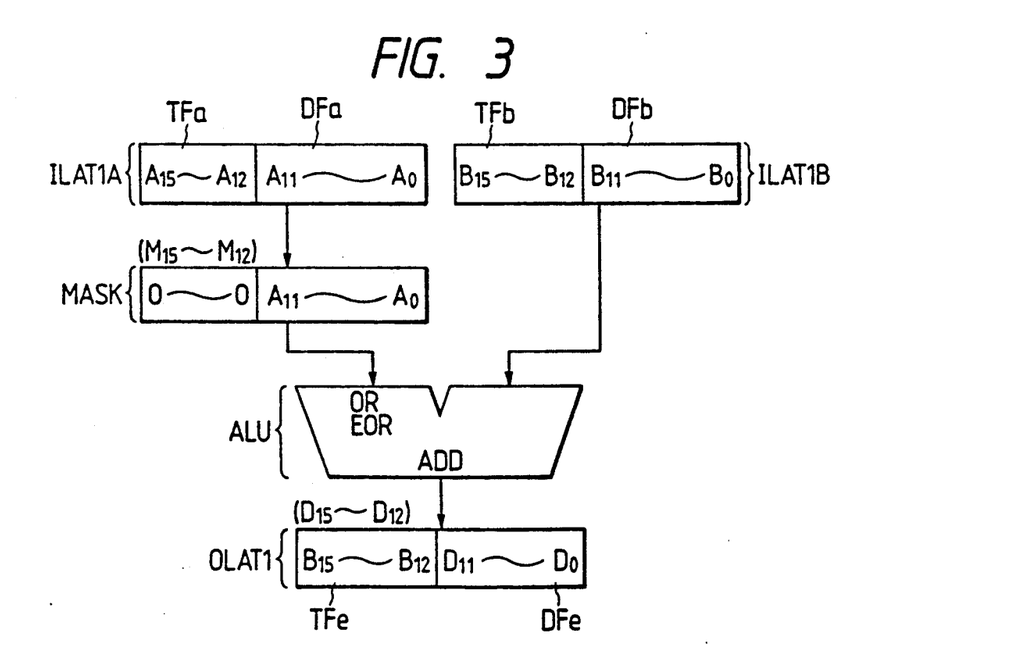
FIG. 3 is a diagram for explaining the operation of the embodiment in FIG. 1 in the case of masking a tag field into logic "0" in the arithmetical or logical operation for data with tags.

Accordingly, in executing the arithmetical and logical operations for the data with the tags as shown in FIGS. 2 and 3, the step of separating the data fields and tag fields from the data to-be-processed and the step of affixing a predetermined tag field to an operated result for the information items of the separated data fields are dispensed with, so that high-speed operations for the data with the tags are achieved.

Figure 4:
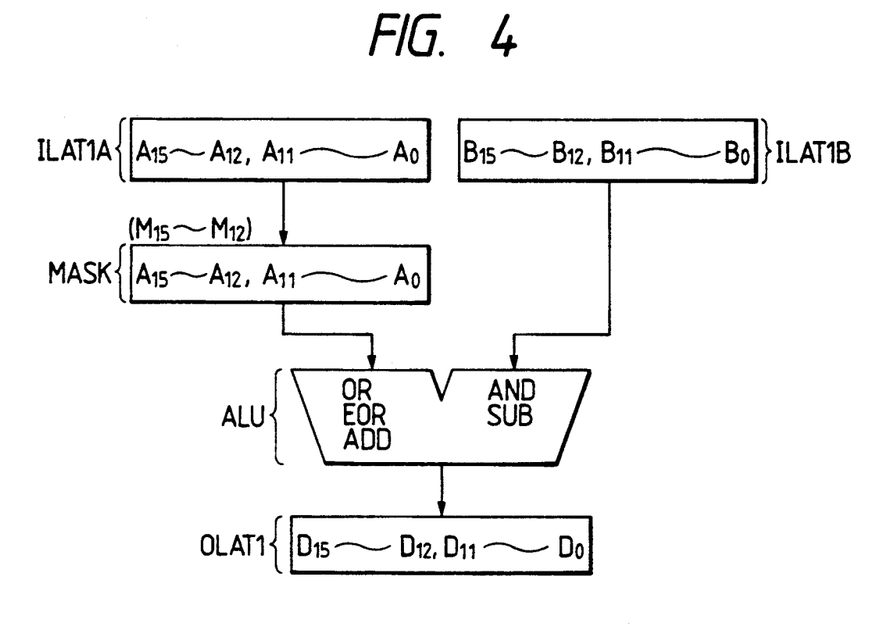
FIG. 4 is a diagram for explaining the arithmetical or logical operation of the embodiment in FIG. 1 for data with no tag.

In executing an arithmetical or logical operation for input data $A_0$–$A_{15}$ and $B_0$–$B_{15}$ made up of only data fields as shown in FIG. 4, microinstructions successively read out of the microinstruction ROM 4 in conformity with the sort of such an operation are decoded by the microinstruction decoder 7, whereby the control signal $\phi_1$ is brought to the select level. Thus, the input data items $A_0$–$A_{15}$ and $B_0$–$B_{15}$ are supplied to the arithmetic and logic operation circuit ALU without any change and are used for the predetermined logical operation.

Figure 5:
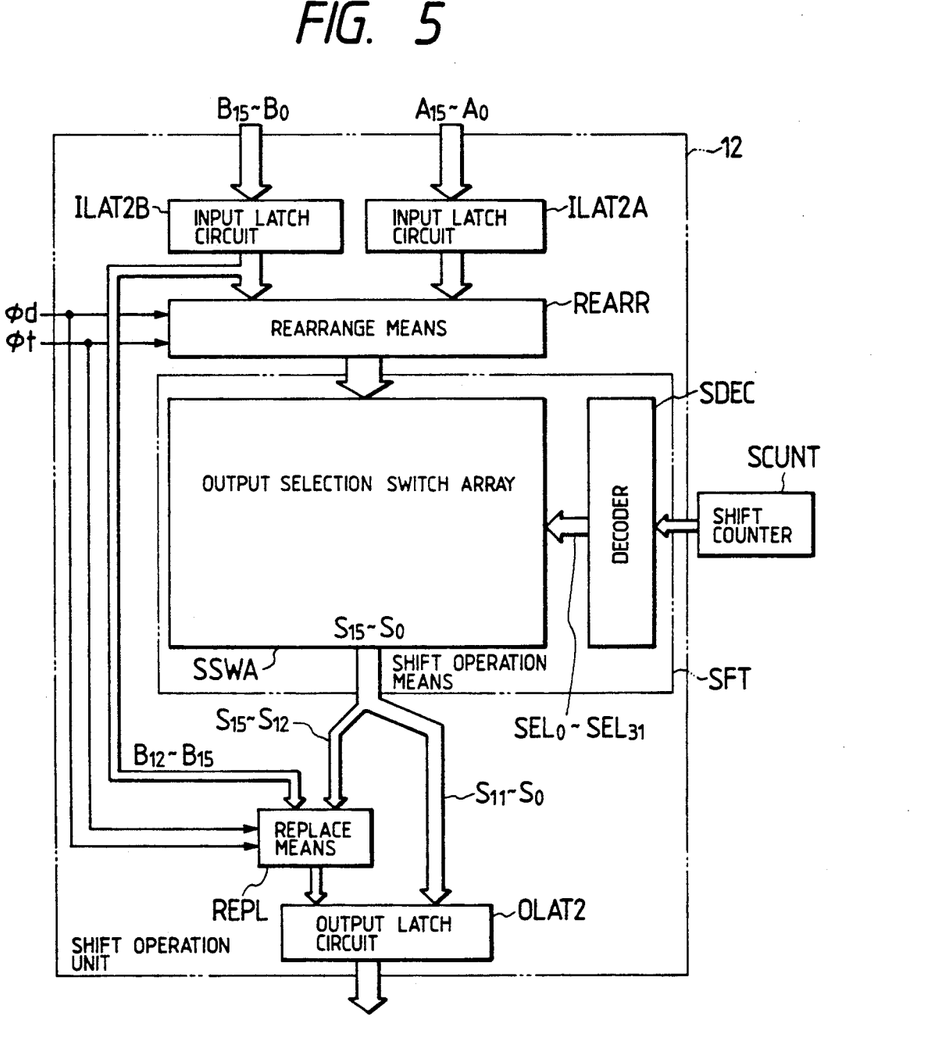
FIG. 5 is a block diagram of an embodiment of a shift operation unit according to the present invention.

FIG. 5 exemplifies the shift operation unit 12 such as barrel shifter.

Likewise to the arithmetic and logic operation unit 11, the shift operation unit 12 shown in FIG. 5 executes shift operations for both data with tags, each having the tag field assigned to the upper 4 bits in 1 word, and data with no tag.

This shift operation unit 12 has input latch circuits ILAT2A and ILAT2B which are respectively supplied with 16-bit data $A_0$–$A_{15}$ on one side and 16-bit data $B_0$–$B_{15}$ on the other side to-be-processed, through the internal buses BUS1 and BUS2. A method of supplying the data from the internal buses BUS1 and BUS2 to the input latch circuits ILAT2A and ILAT2B is the same as in the case of the arithmetic and logic operation unit 11. In a case where the input data items are the data with the tags, the upper 4 bits $A_{15}$–$A_{12}$ and $B_{15}$–$B_{12}$ constitute tag fields TFa and TFb, respectively, and the lower 12 bits $A_0$–$A_{11}$ and $B_0$–$B_{11}$ constitute data fields DFa and DFb, respectively.

Although no special restriction is meant, when one pair of abstract data are to be processed in the shift operation unit 12, the information of the tag field to be conserved in a processed result is set to be the information of the tag field TFb which is latched in one input latch circuit ILAT2B. In other words, data which contains the information of the tag field to be conserved in the shift operation result is supplied to the input latch circuit ILAT2B.

In FIG. 5, symbol REARR denotes rearrange circuitry or means for rearranging the information items of the data fields DFa and DFb respectively contained in one pair of input data to-be-processed, into a serial form.

Figure 6:
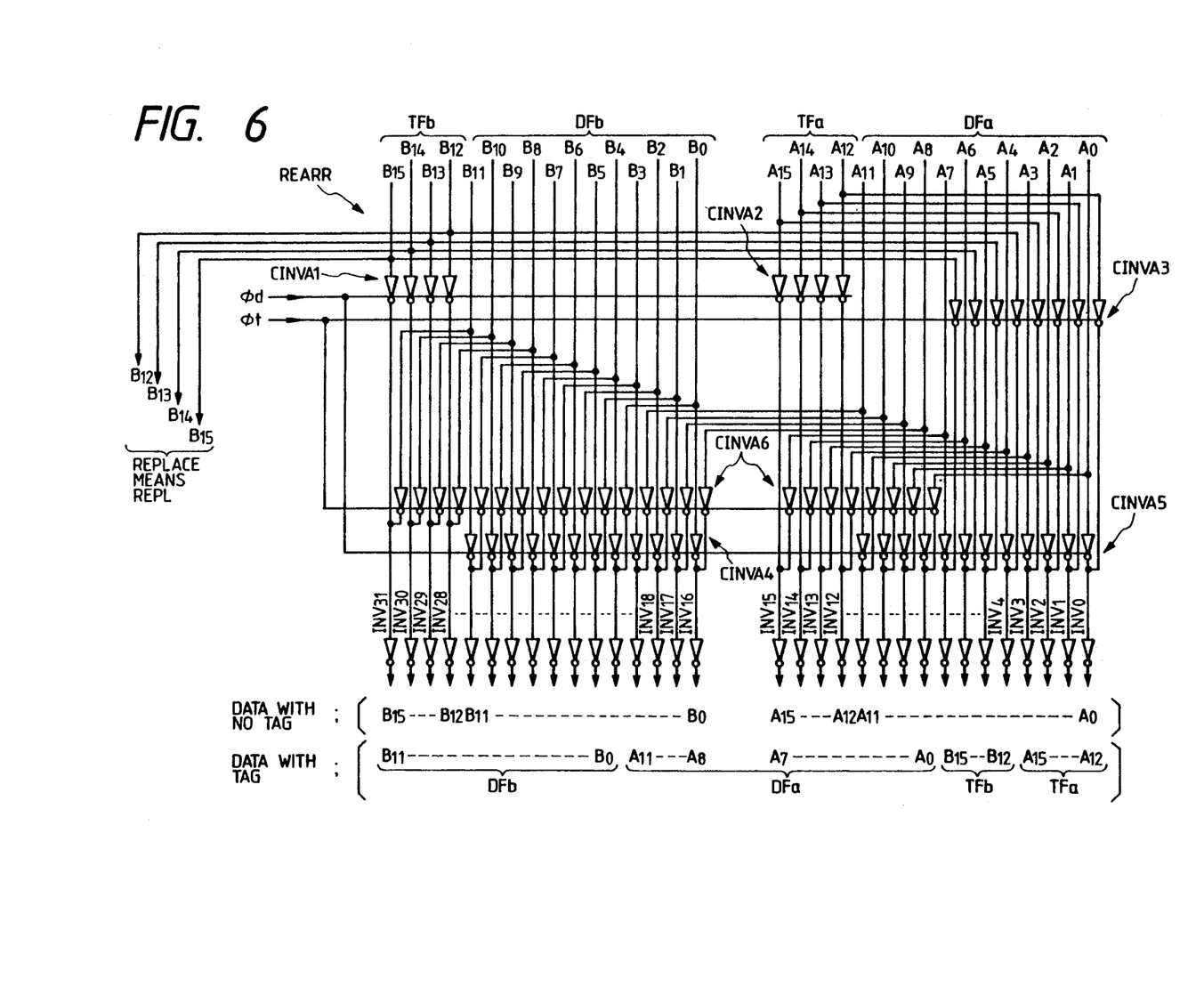
FIG. 6 is a logic diagram of an example of rearrange circuit included in the embodiment in FIG. 5.

Although no special restriction is intended, the rearrange circuit REARR operates in the case of the input data $A_0$–$A_{15}$ and $B_0$–$B_{15}$ being the data with the tags, to change the arrayal of the respective bits into the order of the data fields DFb and DFa and the tag fields TFb and TFa and to deliver the rearranged bits as outputs, as illustrated in FIG. 6. In a case where the input data items $A_0$–$A_{15}$ and $B_0$–$B_{15}$ are the data with no tag, the rearrange means does not rearrange the respective bits of the input data and delivers them as outputs in an order left intact.

Although a circuit arrangement for such rearrangement of the input bits is not especially restricted, it includes as shown in FIG. 6, a clocked inverter array CINVA1 which receives the bits $B_{15}$–$B_{12}$ and which are coupled to the input terminals of output inverters INV$_{31}$–INV$_{28}$, a clocked inverter array CINVA2 which receives the bits $A_{15}$–$A_{12}$ and 10 which are coupled to the input terminals of output inverters INV$_{15}$–INV$_{12}$, a clocked inverter array CINVA3 which receives the bits $B_{15}$–$B_{12}$ and the bits $A_{15}$–$A_{12}$ and which are coupled to the input terminals of output inverters INV$_7$–INV$_0$, a clocked inverter array CINVA4 which receives the bits $B_{11}$–$B_0$ and which are coupled to the input terminals of output inverters INV$_{27}$–INV$_{16}$, a clocked inverter array CINVA5 which receives the bits $A_{11}$–$A_0$ and which are coupled to the input terminals of output inverters INV11–INV$_0$, and a clocked inverter array CINVA6 which receives the bits $B_{11}$–$B_0$ and $A_{11}$–$A_0$ and which are coupled to the input terminals of the output inverters INV31–INV$_8$.

A control signal $\phi_d$ is supplied to the selection terminals of the clocked inverter arrays CINVA1, CINVA2, CINVA4 and CINVA5, while a control signal $\phi_t$ is supplied to the selection terminals of the clocked inverter arrays CINVA3 and CINVA6. Although not especially restricted, the control signals $\phi_d$ and $\phi_t$ are output from the microinstruction decoder 7 which decodes microinstructions read out of the microinstruction ROM 4 in succession. The series of microinstructions for each of various shift operations as stored in the microinstruction ROM 4 contain information for specifying the sort of the corresponding shift operation, and information for designating whether or not data to be processed are data with tags. In accordance with the above information items, in a case where the data to be processed are the data with the tags, the control signal $\phi_t$ is brought to a select level such as high level, whereby the input bits have their arrayal changed and are then output as described above. In a case where the data to be processed are the data with no tag, the control signal $\phi_d$ is brought to a select level such as high level, whereby the bits of the input data are not rearranged and are output in the order left intact.

In FIG. 5, symbol SFT denotes shift operation means for executing the shift operation for the 32-bit data delivered as the outputs from the rearrange circuit REARR, thereby to deliver shift data $S_{15}$–$S_0$ of 16 bits as outputs. Although not especially restricted, the shift operation circuit SFT is constructed of an output selecting switch array SSWA of 32 columns which can select and output the 16-bit shift data $S_{15}$–$S_0$ in one aspect among, at most, 32 output aspects that are obtained by shifting the 32 bits of the input data one by one in the rightward direction as viewed in the figure, a shift counter SCUNT which determines the number of shift bits of the input data within a range up to 32 bits, and a decoder SDEC which decodes the outputs of the shift counter SCUNT to form selection signals SEL$_0$–SEL$_{31}$ for selecting one predetermined column among the 32 columns of the output selecting switch array SSWA, and which delivers the output shift data $S_{15}$–$S_0$ conforming to the shift number instructed by the shift counter SCUNT.

In FIG. 5, symbol REPL denotes replace circuitry or means capable of replacing the upper 4 bits $S_{15}$-$S_{12}$ of the shift data $S_{15}$-$S_0$ delivered as the outputs from the output selecting switch array SSWA, with the information items $B_{15}$-$B_{12}$ contained in the tag field TFb of the input data $B_{15}$-$B_0$.

Figure 7:
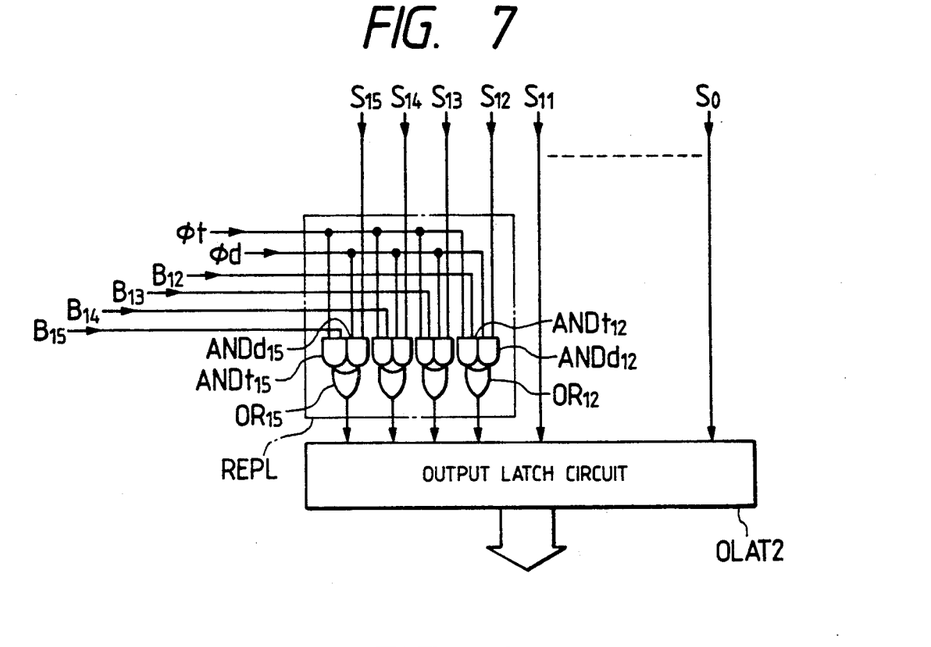
FIG. 7 is a block diagram of an example of replace circuit included in the embodiment in FIG. 5.

Although not especially restricted, the replace circuit REPL is constructed as a multiplexor by which the bits $S_{15}$-$S_{12}$ or the bits $B_{15}$-$B_{12}$ are selectively output as illustrated in FIG. 7. More specifically, it includes AND gates $ANDd_{15}$-$ANDd_{12}$ which receive the bits $S_{15}$-$S_{12}$ and the control signal $\phi_d$ as 2 inputs, AND gates $ANDt_{15}$-$ANDt_{12}$ which receive the bits $B_{15}$-$B_{12}$ and the control signal $\phi_t$ as 2 inputs, and OR gates $OR_{15}$-$ORd_{12}$ which receive the outputs of the AND gates $ANDd_{15}$-$ANDd_{12}$ and AND gates $ANDt_{15}$-$ANDt_{12}$ as 2 inputs. Thus, under the action of the control signal $\phi_t$ which is controlled to the high level in response to the shift operation process of the data with the tags, the replace circuit REPL replaces the upper 4 bits $S_{15}$-$S_{12}$ of the shift data $S_{15}$-$S_0$ with the information items $B_{15}$-$B_{12}$ contained in the tag field TFb of the input data $B_{15}$-$B_0$ and then affords these information items to an output latch circuit OLAT2, whereas under the action of the control signal $\phi_d$ which is controlled to the high level in response to the shift operation process of the data with no tag, the replace circuit affords the upper 4 bits $S_{15}$-$S_{12}$ of the shift data $S_{15}$-$S_0$ to the output latch circuit OLAT2 without any change.

Next, the operation of the shift operation unit 12 will be described.

Figure 8:
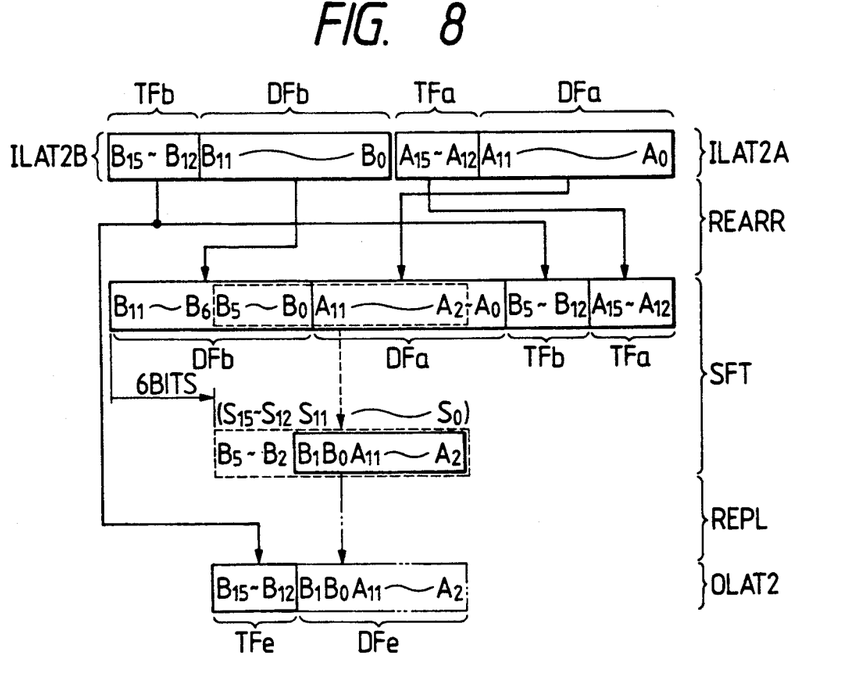
FIG. 8 is a diagram for explaining the shift operation of the embodiment in FIG. 5 for data with tags.

First, the case where the input data items $A_{15}$-$A_0$ and $B_{15}$-$B_0$ are the data with the tags will be explained with reference to FIG. 8.

In the case where the input data items $B_0$-$B_{15}$ and $A_0$-$A_{15}$ to be subjected to the shift operation are the data with the tags, the control signal $\phi_t$ which is output from the microinstruction decoder 7 is responsively set at the high level, and the control signal $\phi_d$ at a low level. Thus, the rearrange circuit REARR changes the arrayal of the respective bits into the order of the data field DFb, data field DFa, tag field TFb and tag field TFa so as to put the information items of the data fields DFa and DFb of both the input data into the serial form and then delivers the rearranged bits as outputs.

The shift operation circuit SFT receiving the outputs of the rearrange circuit REARR shifts the input data thereof a predetermined number of bits in accordance with a microprogram control, and delivers the shift data $S_{15}$-$S_0$ of 16 bits as outputs. By way of example, when the shift number is set at 6 bits as illustrated in FIG. 8, the 16 bits of the shift data $S_{15}$-$S_0$ are brought to $B_5$, . . . $B_0$, $A_{11}$ . . . $A_2$.

Among the shift data items $S_{15}$-$S_0$ ($B_5$, . . . $B_0$, $A_{11}$, . . . $A_2$), the upper 4 bits $S_{15}$-$S_{12}$ ($B_5$-$B_2$) are supplied to the replace circuit REPL. Since, however, the control signal $\phi_t$ is set at the high level in conformity with the process of the data with the tags, the replace circuit REPL selects and outputs the information items $B_{15}$-$B_{12}$ of the tag field TFb. Thus, the tag field TFe of operated 10 result data to be afforded to the output latch circuit OLAT2 conserves the information items $B_{15}$-$B_{12}$ contained in the tag field TFb of the input data $S_{15}$-$S_0$, and the data field DFe thereof contains serial shift operation results ($B_1$, $B_0$, $A_{11}$, . . . $A_2$) concerning the information items of the data fields DFa and DFb in the input data $A_{15}$-$A_0$ and $B_{15}$-$B_0$.

Figure 9:
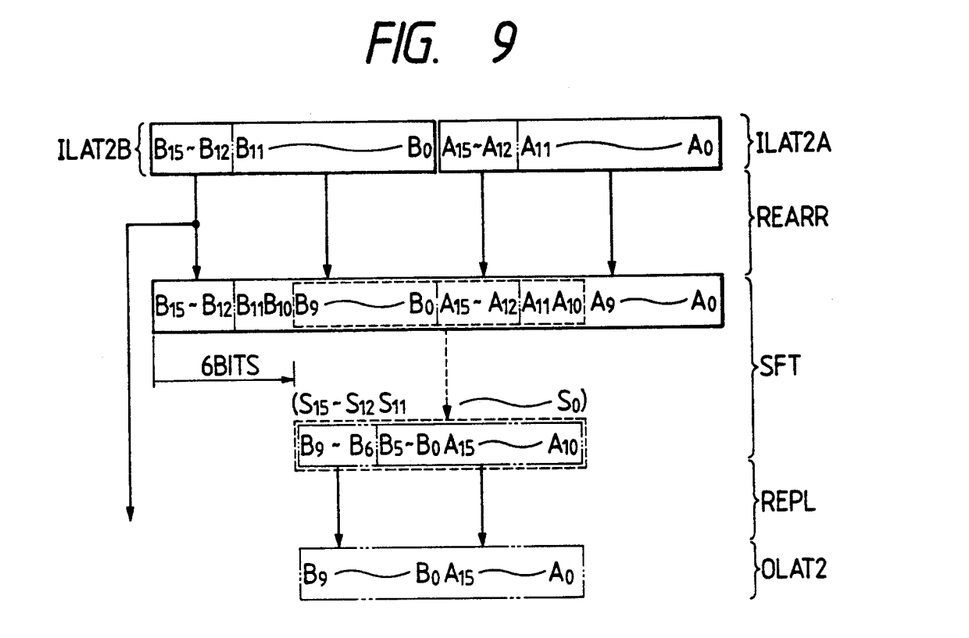
FIG. 9 is a diagram for explaining the shift operation of the embodiment in FIG. 5 for data with no tag.

The case where the input data items $A_{15}$-$A_0$ and $B_{15}$-$B_0$ are the data with no tag will be explained with reference to FIG. 9.

In the case where the input data items $B_0$-$B_{15}$ and $A_0$-$A_{15}$ to be subjected to the shift operation are the data with no tag, the control signal $\phi_t$ which is output from the microinstruction decoder 7 is responsively set at a low level, and the control signal $\phi_d$ at the high level. Thus, the rearrange circuit REARR does not rearrange the respective bits of the input data $B_{15}$-$B_0$ and $A_{15}$-$A_0$ and delivers them as outputs in the order left intact.

On this occasion, the shift operation circuit SFT receiving the outputs of the rearrange circuit REARR shifts the input data thereof a predetermined number of bits in accordance with a microprogram control, and delivers the shift data $S_{15}$-$S_0$ of 16 bits as outputs. By way of example, when the shift number is set at 6 bits as illustrated in FIG. 9, the 16 bits of the shift data $S_{15}$-$S_0$ are brought to $B_9$, . . . $B_0$, $A_{15}$, . . . $A_{10}$.

Among the shift data items $S_{15}$-$S_0$ ($B_9$, . . . $B_0$, $A_{15}$, . . . $A_{10}$), the upper 4 bits $S_{15}$-$S_{12}$ ($B_9B_6$) are supplied to the replace circuit REPL. Since, however, the control signal $\phi_d$ is set at the high level in conformity with the process of the data with no tag, the replace circuit REPL selects the outputs of the upper 4 bits $S_{15}$-$S_{12}$ ($B_9$-$B_6$) among the shift data. Thus, the shift data items $S_{15}$-$S_0$($B_9$, . . . $B_0$, $A_{15}$, . . . $A_{10}$) are afforded to the output latch circuit OLAT2 without any change.

According to the embodiments described above, the following effects can be attained:

The arithmetic and logic operation unit 11 included in the coprocessor 1 masks the tag field TFa of input data $A_0$-$A_{15}$ on one side into logic "0" for a logical sum, exclusive "or" or addition operation or the like and into logic "1" for a logical product or subtraction operation or the like, whereupon it executes the arithmetical or logical operation for the pair of input data, and on that occasion, it prevents a carry from lower bits from being transmitted to the upper 4 bits $D_{15}$-$D_{12}$ of an operated result. Thus, the result of the arithmetical or logical operation between the data fields DFa and DFb of the input data can be obtained in the operated result $D_0$-$D_{15}$ while the information items $B_{15}$-$B_{12}$ of the tag field TFb in the input data $B_0$-$B_{15}$ is conserved without any change. Accordingly, in executing an arithmetical or logical operation for data with tags, the step of separating data fields and tag fields from the data to-be-processed and the step of affixing a predetermined tag field to an operated result for the information items of the separated data fields are dispensed with, to bring forth the effect that the arithmetical or logical operation of the data with the tags can be executed at high speed by the step.

In the shift operation of data with tags, the shift operation unit 12 included in the coprocessor 1 rearranges the information items of data fields DFa and DFb respectively contained in the input data $A_{15}$-$A_0$ and $B_{15}$-$B_0$ by the use of rearrange circuit REARR so as to make them interlacingly serial and then subjects the serial information items to the shift operation, and as regards the results $S_{15}$-$S_0$ of the operation, it replaces the upper 4 bits $S_{15}$-$S_{12}$ with the information items $B_{15}$-$B_{12}$ of a tag field TFb in the input data $B_{15}$-$B_0$, whereby these information items of the tag field TFb can be conserved in the result of the shift operation. Accordingly, in executing a shift operation for data with tags, the step of separating data fields and tag fields from the data to-be-processed and the step of affixing a predetermined tag field to an operated result for the information items of the separated data fields are dispensed with, to bring forth the effect that the shift operation of the data with the tags can be executed at high speed by one step.

Besides, regarding data with no tag as made up of only data fields, the arithmetic and logic operation unit 11 can release the masking function for the input data and the carry inhibiting function for the predetermined bits in the case of the arithmetical or logical operation, whereby it can execute the arithmetical and logical operations, not only for the data with the tags, but also for the data with no tag.

Similarly, regarding data with no tag, the shift operation unit 12 does not select the function of rearranging the input data by the use of rearrange circuit REARR and the function of replacing shift data by the use of replace circuit REPL, whereby it can execute the shift operations, not only for the data with the tags, but-also for the data with no tag.

Accordingly, the execution unit 3 executes the operations of the data with the tags at high speed and is also permitted to execute the operations of the data with no tag, thereby to contribute to enhancement in the performance of the run of an AI language program as the whole system including the coprocessor 1.

Although, in the above, the invention made by the inventors has been concretely described in conjunction with embodiments, it is needless to say that the present invention is not restricted to the foregoing embodiments, but that it can be variously altered within a scope not departing from the purport thereof.

In the embodiments, as a conservation means for conserving the information of the predetermined second information field of input data in processed result output data, mask circuit MASK has been adopted in an arithmetic and logic operation unit, and rearrange circuit REARR and replace circuit REPL have been adopted in a shift operation unit, but the present invention is not restricted to them. By way of example, in the arithmetic and logic operation unit, the conservation circuit can be constructed in such a way that the replace circuit as explained in the shift operation unit is disposed at a stage preceding an output latch circuit. Further, the operation unit of the present invention is not restricted to the shift operation unit and the arithmetic and logic operation unit explained in the embodiments, but it can be constructed as an adder, a multiplier, etc.

In the embodiments, there have been described cases where the tag field to be conserved is contained in the upper bits of data containing this tag field. However, for data of a structure in which the tag field is contained in the lower bits of the data, operation units can be constructed in such a way that the positions and circuit arrangements of the conservation circuit as explained in the embodiments are brought into correspondence with the lower bit side of the input data. Further, the conservation circuit can be constructed so as to be selectively applicable to both the structure having the tag field on the lower bit side and the structure having the tag field on the upper bit side.

The rearranging form in which data fields are serialized by the rearrange circuit as explained in the embodiments, is a mere example, and the respective bits of one pair of input data may well be rearranged so as to be alternately arrayed. By way of example, in a case where the input data items $A_{15}$–$A_0$ and $B_{15}$–$B_0$ are data with no tag, they are not, in effect, subjected to the rearrangement of serializing the data fields thereof, and the respective input bits are arrayed as $B_{15}$, $A_{15}$, ... $A_0$, $B_0$, which are output. In a case where the input data items are data with tags, they are, in effect, subjected to the rearrangement of serializing the data fields thereof, and the respective input bits are arrayed as $B_{15}$, $B_3$, $B_{14}$, $B_2$, $B_{13}$, $B_1$, $B_{12}$, $B_0$, $A_{15}$, $A_{11}$, $A_{14}$, $A_{10}$, $A_{13}$, $A_9$, $A_{12}$, $A_8$, $B_{11}$, $A_7$, $B_{10}$, $A_6$, ... $B_5$, $A_1$, $B_4$, $A_0$, which are output. Such rearranging systems can be brought into various aspects in conformity with the ways of selecting switch columns in shift operation circuit.

The embodiments have been described concerning abstract data the first information field of which is the data field and the second information field of which is the tag field for indicating the attribute of the data field, but the relation between the first information field and the second information field is not restricted thereto and can be properly altered. Further, the bit formats of the first information field and the second information field are not restricted to those of the embodiments.

In addition, the embodiments have been described as the operation units applicable to both the data with the tags and the data with no tag, but it suffices for the present invention that data of a structure having, at least, the first information field and the second information field can be processed. Besides, controls for the operation units are not restricted to microprogram controls, but they can also be performed by a wired logic control system.

Although, in the above, the invention made by the inventors has been chiefly described in relation to the cases of applications to processors handling an AI language as form the background field of utilization, the present invention is not restricted thereto but is extensively applicable to data processors such as general-purpose processors and various peripheral controllers.

What is claimed is:

1. A data processor comprising:
   control signal generating means for generating control signals in accordance with instructions; and
   execution means coupled to said control signal generating means and including first holding means for holding a first data having first and second information fields, second holding means for holding a second data having first and second information fields, operation means coupled to said first and second holding means for executing an operation in accordance with an instruction between said first and second data, and output holding means coupled to said operation means for holding an output data from said operation means, said output data having first and second information fields;
   wherein said operation means includes,
      means coupled to said control signal generating means responsive to a predetermined first instruction for conserving the first information field of said first data in the first information field of said output data, and means for preventing a conserved first information field of said output data from being disturbed during execution of said operation between the second information fields of said first and second data,
      rearrange means coupled to said control signal generating means and responsive to said predetermined first instruction for rearranging said first and second information fields, respectively contained in said first and second data, into a serial form, including means for delivering serialized data as outputs to a shift operation means, said serialized data having first and second information fields, and replace means coupled to said control signal generating means and responsive to said predetermined first instruction for replacing the first information field of data to be delivered as outputs from said shift operation means, with said first information filed of said first data.

2. The data processor according to claim 1, wherein said rearrange means includes means responsive to a predetermined second instruction for providing said first and second data to said shift operation means without rearranging.

3. The data processor according to claim 1, wherein said replace means includes means coupled to said control signal generating means and responsive to said predetermined second instruction for providing said outputs for said shift operation means to said output holding means without replacing.

4. The data processor according to claim 1 wherein each of said first information fields of said first, second, and serialized data is a tag field and each of said second information field of said first, second, and serialized data is a data field.

5. A data processor comprising:

controlled memory means for storing executable instructions;

execution means for executing the instructions successively read out of said controlled memory means, said execution means including operation means for processing data of a structure which has a data field and a tag field expressive of at least one of an attribute and a type of the data field and means for receiving such data as input data, said operation means including, mask means responsive to a predetermined first instruction for masking the tag field contained in a portion of input data into a predetermined logical value in accordance with said predetermined first instruction, and means for supplying a masked tag field to said logical operation means, wherein said mask means includes means for defining a control state in which the tag field of the input data is masked into logic "0" in accordance with any of logical sum, exclusive "or" and addition operations, means for defining a control state in which the tag field of the input data is masked into logic "1" in accordance with either of logical product and subtraction operations, and means for defining a control state in which the masking is not performed for data of a structure made up of only the data field, logical operation means for completing a logical operation on masked tag field data of the input data, rearrange means responsive to a predetermined second instruction for rearranging information items of the data fields respectively contained in a pair of input data to-be-processed of the input data, into a form adapted for serial transmission and including means for delivering serialized information items as outputs, said rearrange means has means for defining a control state in which the rearrangement is not performed for the pair of input data comprised only of the data field, thereby to supply said shift operation means with unaltered input data, the rearrange means including shift operation means for selectively shifting data supplied from said rearrange means, including means for outputting shifted data, and said shift operation means including replace means responsive to said predetermined second instruction for replacing part of data to be output from said shift operation means, with information of the tag field contained in the portion of input data, wherein said replace means has means for defining a control state in which, in response to the control state of said rearrange means, the replacing operation is not performed for input data comprised of only the data field; and wherein said controlled memory means includes means for storing instructions for selectively designating the control states in each of said mask means, rearrange means and replace means and a type of data to-be-processed.

6. A data processor comprising:

controlled memory means for storing executable instructions;

execution means for executing the instructions successively read out of said controlled memory means;

said execution means including operation means for processing data of a structure which has a data field and a tag field expressive of at least one of an attribute and a type of the data field and means for receiving such data as input data;

said operation means including mask means responsive to a predetermined first instruction for masking the tag field contained in a portion of the input data into a predetermined logical value in accordance with said predetermined first instruction, logical operation means for completing a logical operation on masked tag field data of the input data, means for supplying a masked tag field to said logical operation means, rearrange means responsive to a predetermined second instruction for rearranging information items of the data fields respectively contained in a pair of input data to-be-processed of the input data, into a form adapted for serial transmission and including means for delivering serialized information items as outputs, shift operation means for selectively shifting data supplied from said rearrange means, including means for outputting shifted data, and replace means responsive to said predetermined second instruction for replacing part of data to be output from said shift operation means, with information of the tag field contained in the portion of input data;

said mask means including means for defining a control state in which the tag field of the input data is masked into logic "0" in accordance with any of logical sum, exclusive "or" and addition operations, means for defining a control state in which the tag field of the input data is masked into logic "1" in accordance with either of logical product and subtraction operations, and means for defining a control state in which the masking is not performed for data of a structure made up of only the data field;

said rearranging means having means for defining a control state in which the rearrangement is not performed for the pair of input data comprised only of the data field, thereby to supply said shift operation means with unaltered input data;

said replace means having means for defining a control state in which, in response to the control state of said rearrange means, the replacing operation is not performed for input data comprised of only the data field; and, said controlled memory means includes means for storing instruction for selectively designating the control states in each of said mask means, rearrange means and replace means and a type of data to be processed.

* * * * *

UNITED STATES PATENT AND TRADEMARK OFFICE
CERTIFICATE OF CORRECTION

PATENT NO. : 5,327,543
DATED : July 5, 1994
INVENTOR(S) : Masaharu Miura, et al.

It is certified that error appears in the above-indentified patent and that said Letters Patent is hereby corrected as shown below:     On title page, add item

[73]   Assignees:   Hitachi, Ltd.; and, Hitachi Microcomputer Engineering Ltd., both of Tokyo, Japan Signed and Sealed this Twenty-ninth Day of November, 1994

Attest:

BRUCE LEHMAN

*Attesting Officer*            *Commissioner of Patents and Trademarks*